United States Patent [19]

Fidler et al.

[11] 4,113,561
[45] Sep. 12, 1978

[54] VALVE ARRANGEMENT FOR A NUCLEAR PLANT RESIDUAL HEAT REMOVAL SYSTEM

[75] Inventors: Gary L. Fidler, Plum Borough; Richard A. Hill, Monroeville; John P. Carrera, Pittsburgh, all of Pa.

[73] Assignee: Westinghouse Electric Corp., Pittsburgh, Pa.

[21] Appl. No.: 686,858

[22] Filed: May 17, 1976

[51] Int. Cl.² ............................................. G21C 9/00
[52] U.S. Cl. ........................................ 176/38; 176/65
[58] Field of Search ............... 176/37, 38, 65; 244/78, 244/83 G, 85; 137/119

[56] References Cited

U.S. PATENT DOCUMENTS

| | | | |
|---|---|---|---|
| 2,686,285 | 8/1954 | Meredith et al. | 318/489 |
| 3,136,504 | 6/1964 | Carr | 244/78 |
| 3,138,002 | 6/1964 | Ernst et al. | 60/52 |
| 3,338,139 | 8/1967 | Wood | 91/411 |

OTHER PUBLICATIONS

Schultz, "Control of Nuclear Reactors and Power Plants" 2nd ed., 1961, pp. 419–421.

Primary Examiner—Samuel W. Engle
Assistant Examiner—Ralph Palo
Attorney, Agent, or Firm—Edward L. Levine; Z. L. Dermer

[57] ABSTRACT

An improved valve arrangement for a two-train Residual Heat Removal System (RHRS) of a nuclear reactor plant which ensures operational integrity of the system under single failure circumstances including loss of one of two electrical power sources.

1 Claim, 2 Drawing Figures

VALVE ARRANGEMENT FOR A NUCLEAR PLANT RESIDUAL HEAT REMOVAL SYSTEM

BACKGROUND OF THE INVENTION

1. Field of the Invention

This invention relates to nuclear reactor plant systems, and more particularly provides an improved valve arrangement for a nuclear reactor plant Residual Heat Removal System.

2. Description of the Prior Art

Commercial electric power generating nuclear reactor plants have demonstrated an unparalleled safety record. It has continuously been the history of the industry, including the manufacturers, utilizes, and the regulatory agencies to improve not only the safety-oriented systems within the plants, but also auxiliary systems. Many of the design bases for the plant systems are defined in terms of specific hypothetical accident occurrences. Also, more general hypotheses are also applied, such as those referred to as "common mode failure" and "single failure" criteria. The latter, "single failure", refers to protection of the function of plant systems from an assumed failure in any single component in a given system. Such assumed failures may be either passive, such as a piping rupture, or active, such as failure of a valve to respond to a signal to open or close. Typical design response to such assumptions are redundancy in system design and component number, and also system physical separation. Similar criteria have also been applied so as to result in design requirements that certain plant functions must be able to be initiated and controlled from the plant control room.

A typical nuclear plant comprises a primary reactor coolant system housed in a sealed containment structure and a plurality of auxiliary systems, located both within and without the containment, which perform auxiliary functions such as waste processing, component cooling, and emergency coolant injections. A typical residual heat removal auxiliary system (RHRS) assists in cool-down and start-up of the reactor primary system, as well as maintaining the plant in a cold condition during refueling and maintenance operations, and also assisting in emergency injections.

In order to perform these functions, the RHR system includes valves, pumps, connecting piping and electrical sources and interlocks, portions of which are located both within and without the containment. Because the system penetrates the containment, passes reactor coolant, provides a cool-down function, and is directly connected to the primary reactor coolant system, certain of the accident assumptions have been applied to prior art RHR systems and have resulted in good, reliable and safe designs. Typical of such designs is a two-train system. Each physically separate train includes piping which connects to the primary reactor coolant system and contains two motor-operated isolation valves in series; the piping then passes through the containment wall to a pump and then a heat exchanger, and then returns again through the containment wall and connects to the primary reactor coolant system. The two motor-operated valves in series receive electrical power from separate sources, and are individually interlocked with pressure transmitters in the reactor coolant system. In other terms, the first train contains a valve connected to a first electrical bus and also a valve connected to a second bus. The second train similarly contains a valve conected to the same first bus, and a valve connected to the same second bus. With such a system, it can be seen that if one assumes loss of electrical power from one of the sources, when, for example, the valves are closed, neither train can function until the loss is corrected or the valves, located within the containment, are manually opened. For example, if the valves are all closed as is typical during reactor power operation, and it is desired to open them for cool-down, loss of electrical power to one bus prevents opening of either train. The single failure assumption of an electric bus upon which the example is based is not inconsistent with the policies of regulatory authorities, such as the Nuclear Regulatory Commission. Therefore, a system which overcomes the exemplary deficiencies and will allow functioning of a residual heat removal train under such assumed circumstances, will enhance the operational reliability of commercial nuclear power plants.

SUMMARY OF THE INVENTION

This invention provides a valving arrangement which overcomes the deficiencies of prior art RHR systems and ensures operational reliability under assumed conditions which could result in loss of function in previous arrangements. In the preferred embodiment it provides an arrangement, in each of two fluid-flow trains, of three valves in a series-parallel arrangement within the reactor containment building. There is a single valve flow connected to two parallel valves, one of which parallel valves is normally closed during all normal plant operations. The single valve and the normally closed parallel valve are connected to one power source or electrical bus, and the remaining valve to another. Corresponding valves between trains are connected to different buses. (The first valve in the first train is connected to the first bus, the first valve in the second train is connected to the second bus, and so forth). With such an arrangement, an assumed loss of either electrical bus will not render both trains inoperable. The arrangement can also provide redundant isolation from the primary reactor coolant system by two valves. Each valve may further be provided with an electrical interlock from pressure transmitters in the primary system which will provide signals to the valve upon predetermined pressure levels in the primary system. The valves connected to the first bus are interlocked by different transmitters than those connected to the second bus. Also, each normally-closed parallel valve may be interlocked to an independent pressure transmitter. It should be noted that removing one train from service does not defeat the cool-down function of the system; it merely increases the time period to attain a given cool-down temperature.

This invention therefore provides an improved valving arrangement that overcomes prior art deficiencies in that it increases reliability under conditions not inconsistent with safety and operational assumptions utilized in the nuclear industry.

BRIEF DESCRIPTION OF THE DRAWINGS

The function and advantages of this invention will become more apparent from the following description, taken in connection with the accompanying drawings, in which.

DESCRIPTION OF THE PREFERRED EMBODIMENTS

The Residual Heat Removal System (RHRS) of a typical nuclear reactor, and in the particular illustrative pressurized water reactor, includes an arrangement of piping, valves, pumps, heat exchangers, and electrical power sources, connected so as to provide a heat sink to remove heat from the primary system of the reactor, primarily utilized during reactor shutdown and start-up operation. The system also assists in emergency coolant injections. The primary system typically includes a singular reactor vessel flow connected to a plurality of primary loops, or circulation systems, each including a heat exchanger (steam generator) and a pump. Reactor coolant fluid circulates in series from the reactor vessel, containing the reactor core, to the heat exchanger, where energy in the form of heat is transferred, then to a circulation pump, and returned to the vessel. The reactor piping connecting the vessel and steam generator is typically referred to as the "hot leg piping", and the reactor piping connecting the circulation pump and vessel is typically referred to as the "cold leg piping". The primary system, including the primary loops, is contained within a reactor containment building, which provides a barrier to undesirable environmental releases during normal operation and also in the unlikely event of accidental primary system rupture.

Figure 1:
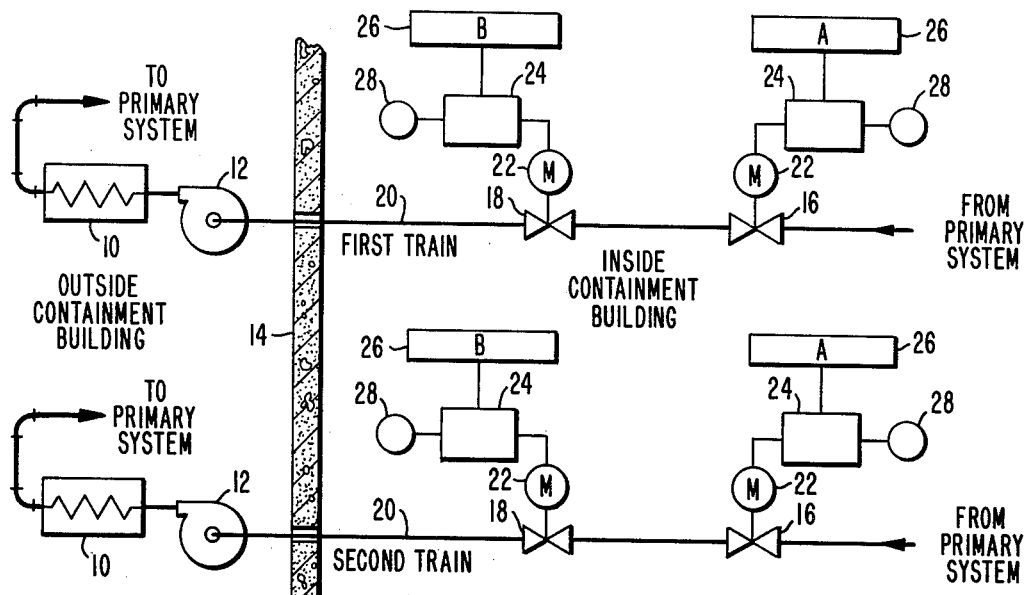
FIG. 1 is a schematic of a typical prior art Residual Heat Removal System arrangement.

Referring now to FIG. 1, there is shown a typical prior art RHRS arrangement. The arrangement includes two separate trains, each having a heat exchanger 10 and a pump 12 located outside of the containment building 14, a first isolation valve 16 and second isolation valve 18 in series within the containment building, and piping 20 connecting the components in the manner shown. The inlet piping 20 typically connects upstream of the valves 16, 18 to a reactor primary system hot leg, and the return piping 20 connects downstream of the heat exchangers 10 to a primary system cold leg. Each of the valves 16, 18 is operated by a motor 22, subsequent to a proper signal from a starter 24. The starter 24 and motor 22 associated with each valve 16, 18 receive electrical power from one of two separate electrical buses, denoted in FIG. 1 by reference numeral 26 and the respective letters "A" and "B". Each starter is also interlocked by a reactor primary system pressure signal from pressure transducers 28. The interlocks prevent a closed valve 16, 18 from being opened when the primary system pressure is above a preselected value, and similarly automatically close an open valve 16, 18 if the primary system pressure rises above a preselected value.

During normal operations, the valves in each train are either both open, or both closed. This is necessary to provide redundant isolation capability from the primary reactor coolant system. The deficiency of this arrangement, however, is readily apparent when one considers the assumption of a single electrical bus ("A" or "B") failure. A valve that is to respond as necessary to open, if powered by the failed bus, will not perform its function, and both trains will remain in a defective orientation.

Figure 2:
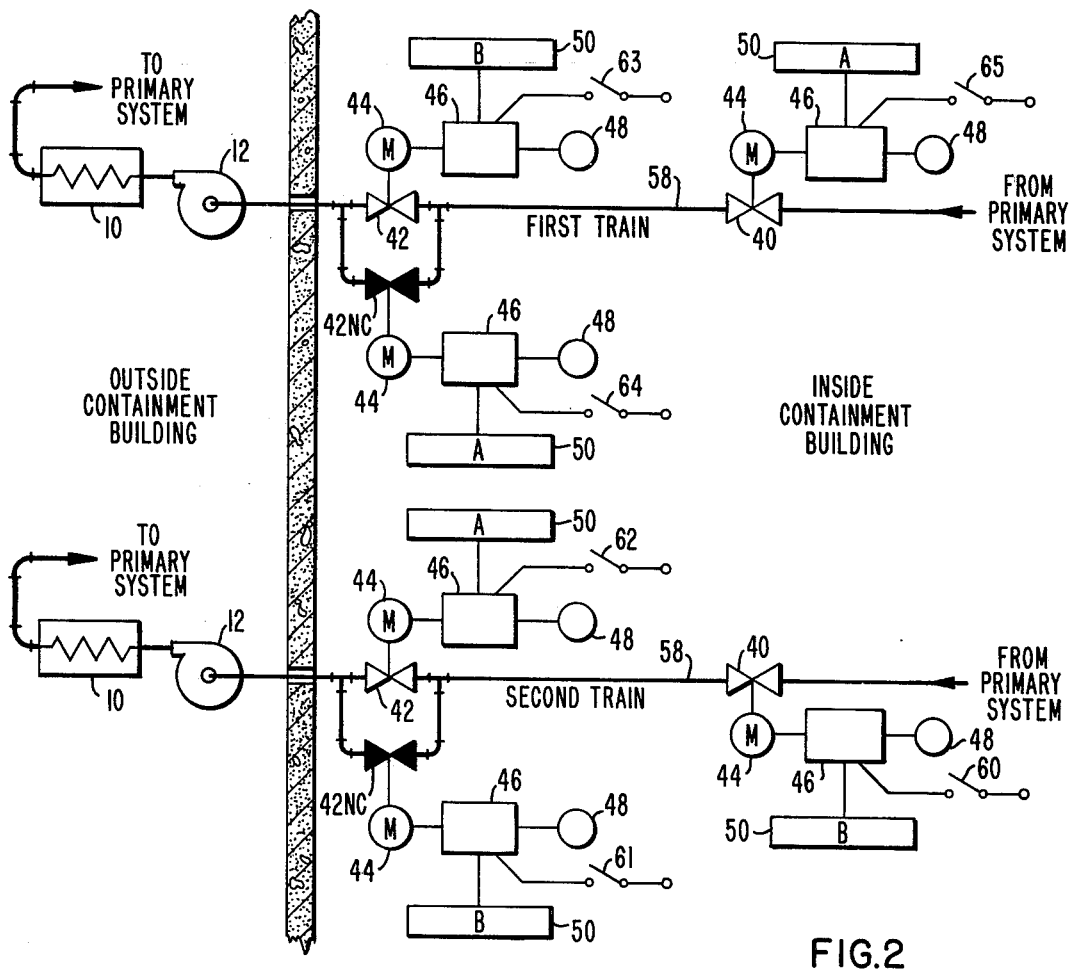
FIG. 2 is a schematic of one embodiment of a Residual Heat Removal System arrangement in accordance with this invention.

This deficiency is overcome by the arrangement provided by this invention and illustrated in FIG. 2, which provides a single valve 40 connected in series to a pair of valves 42 connected in parallel, and one of which valves 42nc (shown solid) is maintained normally closed under all normal operating conditions. Each valve 40, 42, 42nc, is similar to that described above with reference to the prior art, having an operating motor 44, a starter 46, and connections to one of at least two pressure transducers 48 and one of two electrical buses 50, further denoted by the letter "A" or "B". Each normally closed valve may advantageously be connected to an independent pressure transmitter. The starters 46 are connected to operating controls, such as switches 60, 61, 62, 63, 64 and 65, which are preferably located in the plant control room.

The two trains can be considered as opposites in terms of the electrical buses 50A and 50B to which the valves 40, 42, 42nc are connected. In the first train, the singular valve 40 is connected to bus 50A; in the second train the singular valve 40 is connected to bus 50B. Similarly, the normally closed valve 42nc of parallel valves 42 of the first train is connected to bus 50A, and the normally closed valve 42nc of the second train is connected to bus 50B. Similarly, not-normally closed parallel valve 42 in the first train is connected to electrical bus 50B, and the not-normally closed parallel valve 42 in the second train is connected to bus 50A.

The operability and reliability of this arrangement under such circumstances as a single failure including loss of power from one of the two electrical buses is readily apparent. During normal plant operations, "opening" or "closing" of a train is by respectively opening or closing the parallel valve 42 that is not normally closed and also the single valve 40.

To illustrate the response of this arrangement, assume, for example, that the trains are closed, and it is desired to open them, but there exists a bus failure. If bus A fails, the single valve 40 connected to bus B in the second train can be opened, as can normally closed valve 42nc, and fluid flow will be through valve 40 and valve 42nc, both connected to bus B. It should be remembered that plant cool-down can be effected by a single train, although the time to reach a given temperature will be increased.

Similarly, assume, for example, that the trains are open (as shown in FIG. 2), and it is desired to isolate them, but there exists a bus failure. If bus A fails, valve 42 connected to bus B in the first train will operate to close and isolate the train. Valve 40 in the second train will operate to isolate the second train. If bus B fails, valve 40 in the first train will operate to close and isolate the train. Similarly, valve 42 connected to bus A will operate to close and isolate the second train.

There have therefore been disclosed arrangements for a nuclear reactor plant residual heat removal system which ensure, even under single-failure accident assumptions, the ability to isolate the RHR trains and/or provide for plant cool-down.

It will be apparent that modifications and variations are possible in view of the above teachings. It is therefore to be understood that within the scope of the appended claims, the invention may be practiced other than as specifically described.

What is claimed is:

1. An improved valve arrangement for an auxiliary residual heat removal system of a nuclear reactor plant, said plant including a first electrical bus, second electrical bus, and a primary reactor coolant system, said primary system disposed within a containment structure, said residual heat removal system having a first circulating fluid train and a second circulating fluid train, each of said trains having piping connecting said primary system, a pump, and a heat exchanger, said pump and heat exchanger disposed outside of said containment, wherein the improvement comprises:

three motor-operated isolation valves disposed along said piping of each said train within said containment downstream of said primary system positioned such that there is a single valve and two parallel-connected valves, one of which parallel valves is normally closed, said single and normally closed valves of said first train being connected to said first electrical bus and the other parallel valve being connected to said second bus, the single and normally closed valves of said second train being connected to said second electrical bus and the other parallel valve of said second train being connected to said first bus.

* * * * *